(12) United States Patent
Duncan et al.

(10) Patent No.: US 7,002,461 B2
(45) Date of Patent: Feb. 21, 2006

(54) PASSIVE RFID TRANSPONDER/MACHINE-MOUNTED ANTENNA AND READER SYSTEM AND METHOD FOR HIDDEN OBSTACLE DETECTION AND AVOIDANCE

(76) Inventors: Edgar Alan Duncan, 1475 Savannah Rd., Tabor City, NC (US) 28463; Reed Roberts May, 104 Parkleaf Cir., Apex, NC (US) 27502

( * ) Notice: Subject to any disclaimer, the term of this patent is extended or adjusted under 35 U.S.C. 154(b) by 198 days.

(21) Appl. No.: 10/616,757

(22) Filed: Jul. 10, 2003

(65) Prior Publication Data

US 2004/0008120 A1    Jan. 15, 2004

Related U.S. Application Data

(63) Continuation of application No. 09/927,074, filed on Aug. 9, 2001, now Pat. No. 6,621,417.

(51) Int. Cl.
*G08B 26/00*    (2006.01)
(52) U.S. Cl. ............... 340/505; 340/571.1; 340/572.7; 340/568.1; 340/10.1; 340/10.51; 342/429; 342/445
(58) Field of Classification Search ............... 340/505, 340/571.1, 572.7, 568.1, 10.1, 10.51, 572.1; 342/429, 445
See application file for complete search history.

(56) References Cited

U.S. PATENT DOCUMENTS

| | | | |
|---|---|---|---|
| 3,836,842 A | 9/1974 | Zimmerman et al. | |
| 3,916,298 A | 10/1975 | Ulrich | |
| 4,361,202 A | 11/1982 | Minovitch | |
| 4,757,315 A | 7/1988 | Lichtenberg et al. | |
| 4,873,533 A | 10/1989 | Oike | |
| 5,430,379 A | 7/1995 | Parkinson et al. | |
| 5,469,155 A | 11/1995 | Archambeault et al. | |
| 5,499,029 A | 3/1996 | Bashforth et al. | |
| 5,819,859 A | 10/1998 | Stump et al. | |
| 6,693,512 B1 * | 2/2004 | Frecska et al. | 340/10.1 |
| 2002/0008623 A1 * | 1/2002 | Garber et al. | 340/572.1 |

* cited by examiner

*Primary Examiner*—Daniel Wu
*Assistant Examiner*—Tai T. Nguyen
(74) *Attorney, Agent, or Firm*—MacCord Mason PLLC

(57) ABSTRACT

A system designed to detect and identify fixed utility objects, such as telephone pedestals, power transformers, man-holes, anchor cables, and the like, that are hidden by heavy overgrowth of vegetation. The system provides for automatic look-ahead detection of such objects during mowing and clearing operations with heavy machinery using passive radio frequency transponder technology to both detect the immediate presence of a tagged object as well as basic identification of the type of object replying to the interrogation. The operator can be signaled audibly and/or visually when a tagged object is detected. The transmitter and antennae are mounted in the cab of a mobile machine for protection from physical damage. An integrated microprocessor performs the requisite algorithms needed to process the reply form one or more RFID (Radio Frequency Identification) tags and generate the alert signals for the operator alerts. Once the object has been located it can be marked and cleared safely by hand thereby preventing severe damage to the tagged equipment. Handheld RIFD programmers are used to load or record important identification and maintenance data in the attached tag for maintenance tracking, latitude-longitude location, asset management, placement of other related underground devices or cables, etc. The transmitter unit and display devices can be powered directly from the machine's system power.

39 Claims, 2 Drawing Sheets

PASSIVE RFID TRANSPONDER/MACHINE-MOUNTED ANTENNA AND READER SYSTEM AND METHOD FOR HIDDEN OBSTACLE DETECTION AND AVOIDANCE

This nonprovisional utility patent application claims the benefit of one or more prior filed nonprovisional applications. The present application is a Continuation of application Ser. No. 09/927,074, filed on Aug. 9, 2001, now U.S. Pat. No. 6,621,417 which is incorporated herein by reference in its entirety.

BACKGROUND OF THE INVENTION (1) Field of the Invention

The present invention relates generally to transponder/reader systems for the avoidance of hidden, transponder-tagged objects and, more particularly, to a RFID transponder/machine-mounted reader system for the detection and avoidance of hidden utility fixtures during mowing and clearing operations using heavy machinery and for the storage and transmission of information related to the transponder-tagged object.

(2) Description of the Prior Art

Public utilities such as electric power, gas lines, telephone cables, etc. crisscross the landscape running through remote and often poorly accessible right-of-ways. Periodically, these right-of-ways must be mowed and cleared of tall, dense vegetation, including sapling trees. While the large objects such as the main power line towers are easily avoided, the right-of-way usually contains much smaller objects such as telephone pedestals. It is difficult and impractical to manually find and mark every pedestal each time the right-of-way is cleared. When a telephone junction pedestal is accidentally destroyed by the mowing equipment, the repairs are expensive and time-consuming to the utility company and at the very least an irritation to the service users. In some instances where health monitoring or security systems are using the circuits, the outages resulting from such severe damage can be much more serious. Based on actual experience, only about 5% of the telephone pedestals within a power right-of-way are marked accurately before clearing begins. Thus, a need exists for an effective system for preventing accidental damage to the communications junctions and other utility fixtures at a very low cost.

SUMMARY OF THE INVENTION

The present invention is directed to a system of transponder tags/vehicle-mounted reader for hidden obstacle detection and avoidance.

Preferably, the present invention uses passive RFID transponder tags with a vehicle-mounted reader for the detection and avoidance of hidden obstacles.

The present invention is further direct to a system of object identification to provide detailed information pertaining to the tagged object.

The present invention is further directed to a method for the detection and avoidance of hidden obstacles.

Thus, the present invention provides a system of transponder tags/vehicle-mounted reader for hidden obstacle detection and avoidance.

These and other aspects of the present invention will become apparent to those skilled in the art after a reading of the following description of the preferred embodiment when considered with the drawings.

DETAILED DESCRIPTION OF THE PREFERRED EMBODIMENTS

Figure 1:
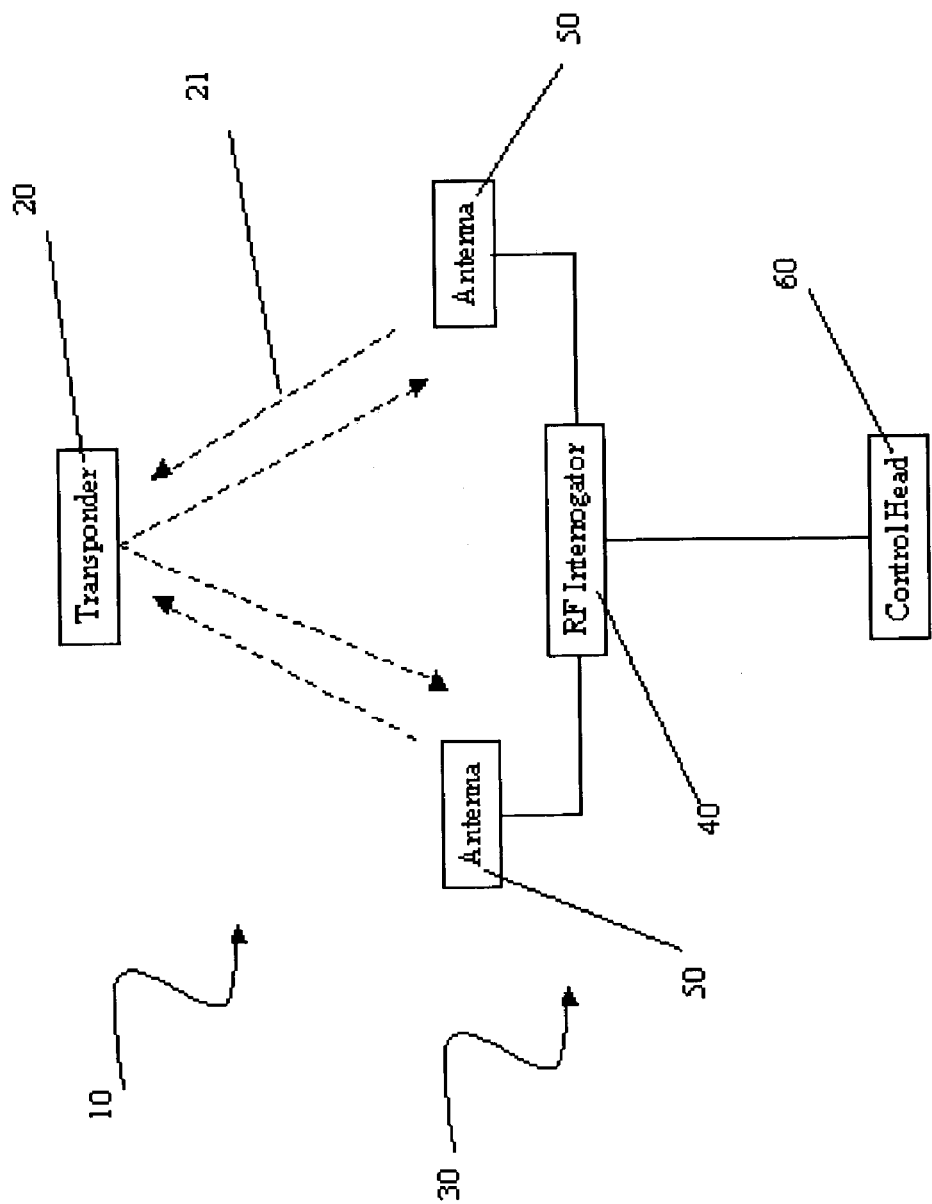
FIG. 1 is a diagrammatic view of a transponder/reader system for the detection of hidden objects constructed according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. As best seen in FIG. 1, the detector system, generally described as 10, includes a transponder 20, in discontinuous radio frequency communication 21 with a machine-mounted RF transponder detection system, generally described as 30. The machine-mounted RF transponder detection system is composed of an RF interrogator 40 connected to at least one antenna 50 and the control head 60.

More particularly, the transponder 20 is preferably a passive Radio Frequency Identification (RFID) transponder. A passive transponder requires no battery and contains integrated non-volatile memory that allows data to be written to and read from individual tags. The transponder tag can be programmed with any type of data desired within the size constraint of the memory. This programming may be done in the field at installation or prior to installation. However, it is not necessary to have any user programming performed for the system to work, as each transponder is factory programmed with a unique identification (ID) number, which is all that is needed for positive detection and identification. Thus, the transponder may be of a type that only transmits a signal to indicate presence, or of a type that can output other information, such as a unique identifier, specific location, description of the tagged object, maintenance dates, test results, and the like. For example, the unique identifier may be the Transmission Electric Facilities Information System (TEFIS) identifier. The location information may be the location based on the global positioning system (GPS) or relative location, such as the relationship of the particular RFID to other RFID transponders or to local buried utilities. The description of the tagged object may include the nature of the equipment tagged, the responsible utility service provider, and other information.

In the preferred embodiment or best mode, the type of data stored in the tag is virtually unlimited. The current technology for the 915 MHz tags allows for a total storage capacity of 1024 bits of which 880 are available for use in the application. That space would hold approximately 145 ASCII characters uncompressed. Numeric data is capable of being stored in binary form. It is expected that the memory capacity will increase as the technology matures; as such the scope of the present invention is intended to include such memory capacity increases. The remaining memory in this embodiment, 144 bits, is reserved for tag identification and format information. A unique 64-bit ID number is assigned to each tag made, another 32 bits are reserved for a manufacturer/tag type code and the last 48 bits are reserved for tag memory layout which can be different for each type of application. The following list is representative of the type of data that can be useful in this application. The formatting and memory allotment following some of the types of data are to demonstrate how the available 880 bits could be used. Examples of data that can be stored include: Object Types (8-bit reference code supports 256 types), Telephone Pedestal, Fiber Optic Junction, Water Hydrant, Gas Valve, Power Transformer, Guy Wire, Cable anchors, Power Pole, Telephone Pole, Boundary Marker, Survey Control Point (SCP), Fence, River/Stream, Metal Tower, Road/Highway, Owner (136 bits), Utility Name (96 bits), Emergency Phone Number (40 bits), TEFIS Number (32 bits), Location (degrees—48 bits), Latitude (24 bits), Longitude (24 bits), Install Date (16 bits), Absolute days since Jan. 1, 1900, Last Service Date (16 bits), Absolute days since Jan. 1, 1900, Local References Count (4 bits), References variable list of up to 15 nearby reference points, Local Reference (40 bits), Distance to object (16 bits—centimeters (655 meters max), Direction to object—16 bits—degrees, Object type code—8 bits. Any additional data could be easily stored in a database indexed to the tag ID number—each of which is unique in the world.

The transponder's function is to alert the machine operator to the presence of a hidden object. To perform this task, the transponder needs to provide the operator with an alert signal approximately two seconds prior to the moving machine physically contacting the hidden object. Thus, the time between signal reception by the transponder and alerting of the operator, called the lag time, is preferably as short as possible, or at least provides for a reasonable response time from the operator.

The RF transponder detection system interrogates the surrounding area for tags a multiplicity of times per predetermined period; for the present invention embodiment, the surrounding are or transponder vicinity is interrogated approximately 200 times per second. Tests show apparent system lag time to be very small in terms of human reaction time and closure rates in the range of 5 ft/sec, which provide for a reasonable response time by the operator and are considered typical for this application. In the tests, the alert for a given configuration occurred at the same physical point for a variety of closing velocities. The majority of the response time is needed for the operator to respond to a visual cue and bring the machine to a stop. On average, the equipment needs to reliably record a target at a range of 10 to 12 feet in moderate undergrowth. The testing that was done showed the equipment constructed and configured according to the present invention was capable of meeting this performance standard.

This lag time is a function of several factors, including at least the detectable signal range of the system, the reaction time of the transponder, the physical environment, and the velocity of the machine. Therefore, the transponder according to the present invention preferably has a sufficiently short reaction time such that it can alert a vehicle moving at the highest rated velocity in the most undesirable environmental conditions in sufficient time to avoid a collision of the machine and the transponder-tagged object.

Examining the sequence of events in terms of distance when approaching a tagged, hidden obstacle using typical operating parameters illustrates the detection range requirements.

Assuming the case of moderate to heavy cover, which results in the poorest visibility conditions, the maximum machine speed suggested is of 2.5 mph, equaling approximately 3.7 ft/sec. The operator reaction time is approximately 0.5 seconds, equaling approximately 1.8 ft. The worst case for the machine stopping distance is 5 ft; in practice the machine can stop almost instantly. The antenna offset behind the leading edge of the cutter head is approximately 3 ft. Therefore, the minimum detection range from the front of the machine required is approximately 1.8+5.0+3.0=9.8 ft.

Alternatively, if the detection system is designed to alert at least two seconds before contacting the object, and the operator requires the entire two seconds to stop the machine, the following results are obtained:

A speed of 3.7 ft/sec produces a minimum distance to stop of 3.7 ft/sec*2 sec=7.3 ft. The antenna offset behind leading edge of the cutter head is approximately 3 ft.

Therefore, the detection range in front of the leading edge of the cutter head must equal at least 7.3+3.0=10.3 ft.

The estimates agree well with each other and are reasonable approximations. Hence the minimum detection range requirement for the system is 10 to 12 feet.

Conditions that may adversely affect the detection range of the system include the following: signal polarization, vegetation density, water, type of plant or vegetation, contact surfaces, and shielding. Preferably, the following considerations are recommended to ensure proper functioning of the system according to the present invention.

Polarization—The tags and reader antenna should be oriented correctly. Also, other antenna techniques such as circular polarization could be employed if required.

Vegetation Density—The more scattering elements between the tag and the reader the more the signal will be attenuated.

Water—The wetter the scattering elements are, the more the signal will be attenuated; however, comparisons between dry and wet brush did not show a significant loss of performance.

Type of Plant—The type of plant and the size of the leaves made noticeable differences in the detection range.

Contact surfaces—The tags cannot be placed directly against metal.

Shielding—Metal structures will shield the tags and impair detection. The tags must be located at the apex of any completely metal object to achieve omnidirectional detection.

Other characteristics of the transponder that may affect the response time will include the minimum input power level for activation, the inherent delay of the transponder circuitry, the alert signal power level, and the effect of temperature, humidity, RF interference and other environmental conditions on the transponder. Characteristics of the machine-mounted components of the system that affect the response time include the interrogatory signal power level of the RF interrogator 40, the alert signal power level of the transponder, the detection threshold of the RF interrogator, and the gain of the antenna.

Because the transponder is preferably a passive transponder, the lower the input energy required by it to generate an alert signal, the farther the detection range it will have. Therefore, it is desirable that the transponder operate at frequencies that are less susceptible to environmental interference and thus require less power to achieve a given range. This frequency range is preferably between about 13.5 MHz and 2.45 GHz, more preferably about 915 Mhz. The FCC has set aside a band of frequencies from 902–928 MHz for various purposes. The 915 MHz system according to the present invention falls into the spread-spectrum application defined in Part 15 of the FCC regulations.

Lower frequencies such as 13.5 MHz are better at penetrating heavy foliage given all other parameters of the system are held constant. However, "equivalent" antennas for that frequency would have physical dimensions measuring several feet as opposed several inches making the overall system much less practical. Thus, higher UHF frequencies allow the desired smaller antenna geometries to be much more efficient than they would be at a lower RFID frequency like 13.5 MHz and offer a good compromise over the microwave RFID tags operating at 2.45 Ghz which have very poor penetration characteristics. Systems currently on the market operating in these other two bands typically advertise read ranges in centimeters. Thus, the performance of the tags and the reader at approximately 915 MHz allows for a smaller antenna geometry and offsets the relative reduction in penetrating ability.

The RF interrogator is mounted on the machine and generates an interrogatory signal that is transmitted via the at least one antenna in the direction of travel. This signal activates the transponder, and therefore is of appropriate frequency and power to activate a transponder within the desired detection range. The appropriate frequency is preferably between about 13.5 MHz and 2.45 GHz, more preferably about 915 Mhz.

Among the hardware available in the RFID industry today the most appropriate technologies for this application use 915 MHz as the operating frequency.

The at least one antenna can be a single antenna or multiple antennae. In the case of use of a single antenna, it can be an omnidirectional antenna, unidirectional antenna, or a directional antenna, such as a dipole antenna or yagi antenna, for increased directionality and range.

Multiple antennae can be used to increase the directionality and/or range of the system. For example, a phased antenna array can be used. These directional and/or ranging antennae can enhance the ability of the operator to avoid hidden utility objects.

Figure 2:
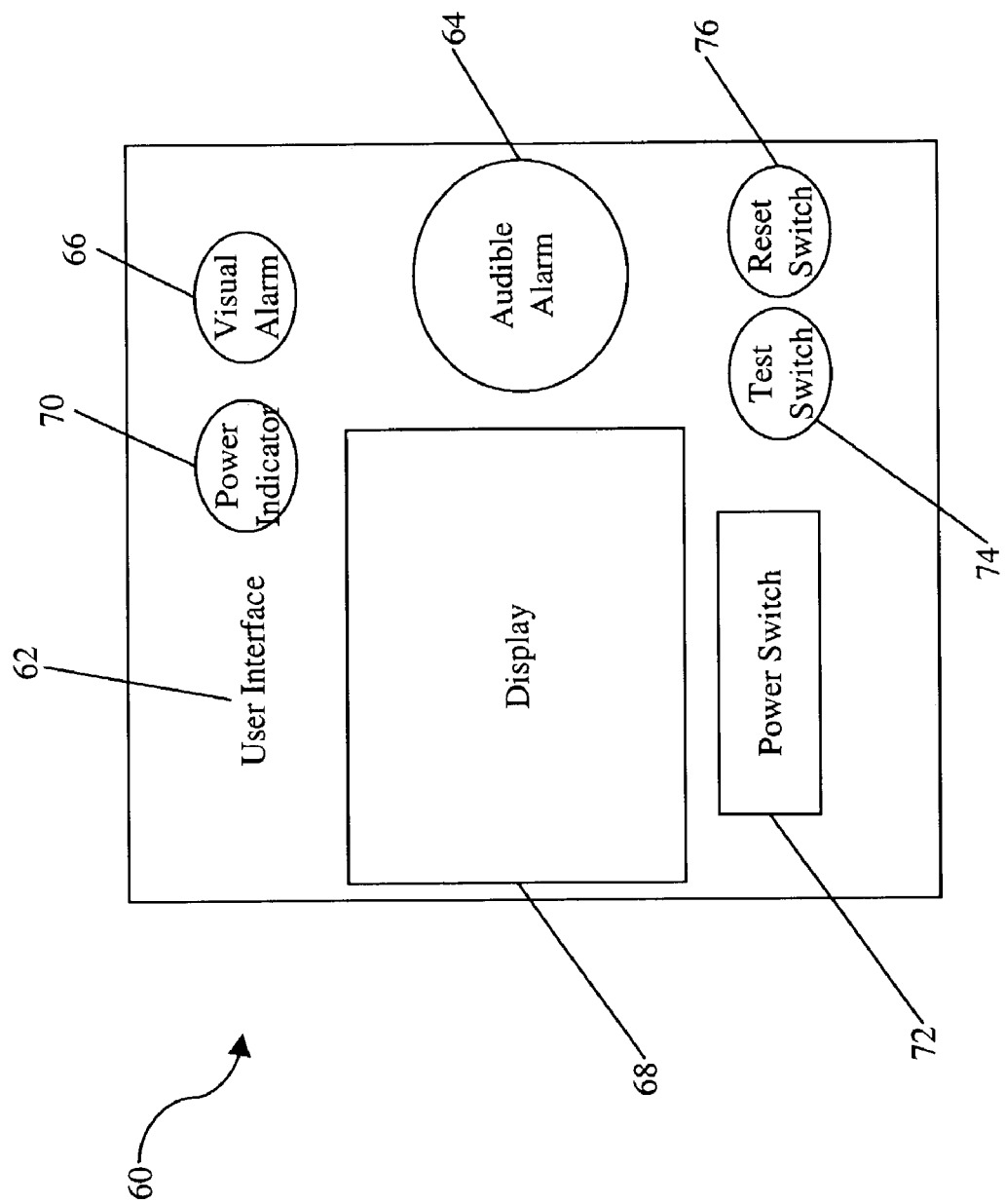
FIG. 2 is a detailed view of the user interface according to an embodiment of the present invention.

An alert signal coming from the transponder is received by the antenna, routed through the RF interrogator, and then transmitted to the control head. In the control head, generally described as 60 in FIG. 2, the signal is received by a microprocessor (not shown) that processes the signal and generates the appropriate output to the user interface 62. The outputs generated may include a sensory alarm to alert the user to the presence of a transponder within the detectable range of the system. The sensory alarms may be visual, auditory, or any other appropriate sensory alarm, and combinations thereof. For example, in situations where there is a high level of background noise, such as mowing high brush with a tractor-mounted mower, an audible alarm 64 alone may be insufficient to ensure alerting of the operator, and therefore other alarms, such as a flashing red light 66, may be installed in the user interface. The outputs may further include the RFID encoded data previously described, such as unique identifier and/or TEFIS number, specific and/or relative location, description of the tagged object, and the like, displayed in an LCD or similar display 68. These outputs can be generated by information transmitted from the transponder, or can be information that is stored in the control head, and pre-linked to the unique identifier transmitted by the transponder. In systems where the transponder transmits the specific location of the transponder, and this location can be linked to a TEFIS object, no reprogramming of the transponder is necessary prior to affixing the transponder to a hidden object. Information about TEFIS object most closely associated geographically with the GPS location of the transponder will be displayed on the control head when the transponder alert signal is received. In cases where the GPS location of the transponder can be either transmitted by the transponder or calculated by the microprocessor as described, and the machine is equipped with a GPS system, the direction and distance of the transponder from the machine can be determined and displayed on the display 68.

Additionally, the control head may be designed to enable simultaneous detection of multiple transponders. In these cases, the control head would be designed to provide an indication of how many separate tags were detected so that the operator would know how many objects needed to be located and avoided. In systems using multiple antennae, the direction of the transponders in relation to the machine can be more accurately determined. For example, multiple, divergent yagi antennae can be arrayed to allow the differentiation of the alert signal into sectors; for example, into three sectors such as dead ahead, proximal left side, and proximal right side. This directional information can then be displayed via the display 68 or via other appropriate means.

The control head also may include basic functions and indicators such as a power-on indicator 70, an power switch 72, a test switch 74 to allow the operator to perform a system confidence test, and a reset switch 76 that allows the operator to clear alerts manually.

In a preferred embodiment according to the present invention, the system has a usable read-range of approximately 15 ft to provide a two to three second warning to the operator. The current technology that best suits the needs of this system are the IntelliTag products from Intermec, which operate on or about the 915 Mhz frequency. In this embodiment, the interrogator and antenna configuration transmit proprietary patterns of RF energy designed to excite a passive tuned transponder circuit contained in packaged tags attached to an object or alternately integral to the object casing. The placement of the antenna or antennae is such that the radiation pattern extends forward of the tractor or other equipment such that a tagged object would be detected as the machine moved toward it and an appropriate alert would be given to the equipment operator warning him/her of the objects close proximity, thus allowing time to stop the machine before the objects is contacted physically. The transmitter is capable of operating continuously as the mowing operation is carried out. Detection and alerts are all handled automatically. Once a tagged object is detected it can be located and cleared since its approximate location is now known, even though it was previously hidden either partially or completely. Once the object has been visually located and can be avoided the operator resets the alert, thus turning off the lamp and tone. The system is capable of ignoring replies from the alerting tag until the replies stop as a result of the machine moving past the object or turning away from it.

The RF transponder detection system can also be connected via wireless technologies to larger or different databases in a remote location, e.g. an office, far from the immediate area in order to provide additional information to the operator in the field.

A method for detecting and avoiding hidden utility objects includes tagging utility objects with preprogrammed passive RFID transponders. The transponders may be programmed during manufacturing or at later times, including up to installation. These RFID may be preprogrammed with a simple presence signal or with more detailed information. After the utility objects have been tagged, the vehicle operator can commence operation with a vehicle fitted with the RF transponder detection system. The vehicle operator powers on the RF transponder detection system and commences operation of the vehicle. When a tuned transponder comes in the detection range of the detection system, the RF transponder detection system alerts the machine operator to the presence of the tuned transponder. The machine operators stops or slows the forward progress of the machine and attempts to locate the tagged utility object. If the object is not readily located, the operator stops the forward progress of the machine until the object is located, based upon the system information indicating the location of an object within a predetermined distance or area. Upon location of the object, the operator either stops the forward progress of the machine, dismounts, and manually clears the object, or continues the forward progress of the machine and avoids the object. Upon locating the object or stopping the forward motion of the machine, the operator can reset the alert signal, stopping the alert for the immediately detected object.

Certain modifications and improvements will occur to those skilled in the art upon a reading of the foregoing description. By way of example, the user interface can be expanded to show area maps based on a database of known tag locations. The map is capable of automatically reregistering itself each time a know tag is encountered. Another example is the connection of the reader via wireless technologies to larger or different databases in an office far from the immediate area in order to provide additional information to the reader in the field. Also, the system can be connected to the machine and programmed to stop the machine automatically in case of emergency; for example, if the machines is continuing to approach a detected RFID after sufficient warning has been given to the operator. Another example is allowing phone lines or other power lines in a pedestal to power an active tag, thus providing extended read ranges. Integrating the system with GPS or DGPS for automatic initialization of newly installed tags is an improvement that can facilitate installation. Another example is integration of the tag into the body of the telephone pedestal itself, thereby preventing theft and vandalism.

All modifications and improvements have been deleted herein for the sake of conciseness and readability but are properly within the scope of the following claims.

We claim:

1. A system for the automatic detection and identification of hidden aboveground fixed utility objects, comprising:
   a. at least one transponder located above ground, which is capable of being tagged to at least one utility object, for radio frequency communication with an radio frequency (RF) scanner/receiver, for communication with a control head;
   b. the RF scanner/receiver and control head being powered directly by a power source; wherein, the at least one transponder includes a radio frequency identification transponder that transmits information relating to the location of the hidden object;
   c. the RF scanner/receiver includes at least one antenna and an RF interrogator; and
   d. the control head includes at least one microprocessor and a user interface for automatically communicating the identification of the object; and
   e. the RF scanner/receiver and the control head are removably mounted on a mobile machine; thereby providing the operator of the machine an adequate alert about the identity and location of the object, without requiring operator interpretation when the machine comes in proximity of one of the at least one transponder and allowing an operator of the machine to avoid the at least one object tagged by the respective transponder.

2. The system of claim 1, wherein the system provides to the operator approximately two seconds response time prior to physically contacting the utility object.

3. The system of claim 1, wherein the RFID operates at a frequency band of approximately 915 MHz.

4. The system of claim 1, wherein the RFID outputs the location of the tagged object relative to a predetermined positional reference datum.

5. The system of claim 1, wherein the at least one antenna is a directional antenna.

6. The system of claim 5, wherein the directional antenna is selected from the group consisting of a dipole antenna, a yagi antenna, and a unidirectional antenna.

7. The system of claim 1, wherein the at least one antenna includes a multiplicity of antennae.

8. The system of claim 7, wherein the antennae comprise a phased array.

9. The system of claim 8, wherein the antennae comprise directional antennae.

10. The system of claim 7, wherein the antennae comprise ranging antennae.

11. The system of claim 1, wherein the RF interrogator operates at a frequency band of approximately 915 MHz.

12. The system of claim 1, wherein the user interface indicates the presence of an RFID.

13. The system of claim 12, wherein the user interface further indicates the distance of the RFID.

14. The system of claim 12, wherein the user interface further indicates the direction of the RFID.

15. The system of claim 1, wherein the user interface indicates RFID information selected from the group consisting of Object Types, Telephone Pedestal, Fiber Optic Junction, Water Hydrant, Gas Valve, Power Transformer, Guy Wire, Cable anchors, Power Pole, Telephone Pole, Boundary Marker, Survey Control Point, Fence, River/Stream, Metal Tower, Road/Highway, Owner, Utility Name, Emergency Phone Number, TEFIS Number, Location, Latitude, Longitude, Install Date, Last Service Date, Local References Count, Nearby reference points, Local Reference, Distance to object, Direction to object degrees, Object type code, and combinations thereof.

16. The system of claim 1, wherein the user interface provides at least one sensory alarm to alert the user when an RFID is detected.

17. The system of claim 16, wherein the at least one sensory alarm is a visual alarm.

18. The system of claim 16, wherein the at least one sensory alarm is an audible alarm.

19. The system of claim 1, wherein the user interface provides a test function.

20. The system of claim 1, wherein the user interface provides a reset control.

21. The system of claim 1, further including a GPS locator for providing the location of the machine.

22. The system of claim 21, wherein the microprocessor use the data from the GPS locator and the RFID to compute the distance and direction of the RFID from the machine.

23. The system of claim 1, further including a wireless communicator for allowing wireless communication between the system and at least one distant database.

24. The system of claim 1, wherein the control head is removably mounted on a mobile machine.

25. A method for locating, servicing, and/or troubleshooting hidden aboveground utility objects, including:

tagging the hidden utility objects with preprogrammed passive RFID transponders;

operating a vehicle for locating, servicing, and/or troubleshooting the utility object fitted with an RF transponder detection system;

decreasing the forward progress of the vehicle when an alert is observed;

communicating with at least one database and automatically collecting and loading REID information from database;

automatically collecting and loading relative position data from surveying equipment and GPS derived information;

locating the tagged utility object;

avoiding the tagged utility object; and resetting the alert signal.

26. The method according to claim 25, further including the step of programming the RFID transponders at installation.

27. The method according to claim 25, wherein the RFID transponders provide information selected from the group consisting of Object Types, Telephone Pedestal, Fiber Optic Junction, Water Hydrant, Gas Valve, Power Transformer, Guy Wire, Cable anchors, Power Pole, Telephone Pole, Boundary Marker, Survey Control Point, Fence, River/Stream, Metal Tower, Road/Highway, Owner, Utility Name, Emergency Phone Number, TEFIS Number, Location, Latitude, Longitude, Install Date, Last Service Date, Local References Count, Nearby reference points, Local Reference, Distance to object, Direction to object degrees, Object type code, and combinations thereof.

28. A method as claimed in claim 27, comprising detecting and identifying an object fully automatically, autonomously, and positively.

29. A method as claimed in claim 27, wherein the motion or action of a piece of heavy machinery is stopped at detection of an RFID transponder.

30. A method as claimed in claim 27, wherein the identification of an object is aided by position data derived from locally provided data from other RFID transponders.

31. A method as claimed in claim 27, wherein the identification of an RFID transponder is aided by a separate radio navigation signal.

32. The method according to claim 25, further including the step of providing to the user the alert approximately two seconds prior to physically contacting the utility object.

33. The method according to claim 25, wherein the alert is at least one sensory alarm.

34. The method of claim 33 wherein the at least one sensory alarm is a visual alarm.

35. The method of claim 33, wherein the at least one sensory alarm is an audible alarm.

36. An RFID transponder detection system for the detection of above-ground objects, comprising:

an antenna arranged to broadcast a signal toward locations above the ground and to receive signals from RFID transponders on above-ground objects, an RF interrogator associated with the antenna to supply signals to the antenna for broadcast and to interpret signals received from RFID transponders;

a microprocessor arranged to receive interpreted signals from the RF interrogator;

microprocessor programming to process interpreted signals, and to identify and locate a RFID transponder;

wherein a database is operatively associated with the microprocessor and stores information about identifying data in RFID transponders that may be attached to aboveground objects to be detected, and the microprocessor programming compares information about detected RFID transponders attached to aboveground objects with information in the database;

a GPS system to determine a geographic location of the REID transponder detection system and operatively associated with the processor; and a user interface for communicating information to a user about a detected RFID transponder.

37. An RFID transponder detection system as claimed in claim 36 wherein the location of a detected RFID transponder is stored in the database.

38. An RFID transponder detection system as claimed in claim 36 wherein the location of a detected RFID transponder is transmitted by the RFID transponder.

39. The system of claim 36 further comprising a vehicle on which the RFID transponder detection system is mounted, wherein the detection system provides an output signal for automatically stopping the vehicle.

* * * * *